Oct. 20, 1959 C. VAN DER LELY ET AL 2,909,024
APPARATUS FOR WORKING CROP LYING ON THE SOIL
Filed June 26, 1956 4 Sheets-Sheet 2

Oct. 20, 1959  C. VAN DER LELY ET AL  2,909,024
APPARATUS FOR WORKING CROP LYING ON THE SOIL
Filed June 26, 1956  4 Sheets-Sheet 3

INVENTORS
CORNELIS VAN DER LELY
BY ARY VAN DER LELY
Ostrolenk, Faber,
Gerb & Soffen
ATTORNEYS United States Patent Office 2,909,024
Patented Oct. 20, 1959

2,909,024

APPARATUS FOR WORKING CROP LYING ON THE SOIL

Cornelis van der Lely and Ary van der Lely, Maasland, Netherlands, assignors to C. van der Lely N.V., Maasland, Netherlands, a Dutch limited-liability company Application June 26, 1956, Serial No. 594,020

Claims priority, application Netherlands July 23, 1955

3 Claims. (Cl. 56—400)

The invention relates to improvements in apparatus for working crop lying on the soil, the said apparatus being provided with one or more tines rotating uniformly around a shaft.

The invention has for its main object to provide an apparatus in which the tines have a shape such that the forces exerted on the tines during working are taken up favorably.

Another object of the invention is to shape the tines such that the crop is not carried along with the tines around the shaft, but is released in time above the soil so that the crop, consequently, is not wound on the shaft.

It has appeared that the purposes in view are achieved when, according to the invention, each tine is provided with a curved part having the shape of an evolvent.

Preferably the various points of the evolvent part have a decreasing distance to the shaft when moving along the evolvent part in the direction of rotation of the shaft.

When applying more than one tine it is a feature of the invention that the tines can lie in the same plane and that all the tines can have the same shape. They can also be arranged on the shaft in the form of at least two sets in which case the tines lie in parallel planes perpendicular to the center line of the shaft.

According to an embodiment of the invention the end of the evolvent part of each tine merges into a part curved in opposite direction.

In order to secure the tines on the shaft according to the invention each tine is provided with a part squarely bent in respect of the evolvent part, the squarely bent parts of the one set of tines lying between the squarely bent parts of the other set of tines and all squarely bent parts being clamped against the shaft by clamping means. The squarely bent parts per se, preferably comprise several parts at different angles with respect to each other and in mounted condition of the tines adjoining the shaft of the device.

In order to prevent that the crop is wound on the shaft when the shaft rotates, the sets of tines are, according to another feature of the invention, separated by a V-shaped plate passing underneath the rotatable shaft which plate with its free ends is mounted to the frame of the device and prevents that the worked crop is wound on the rotating shaft.

Two embodiments of the apparatus according to the invention are represented in the drawings.

Figure 1:
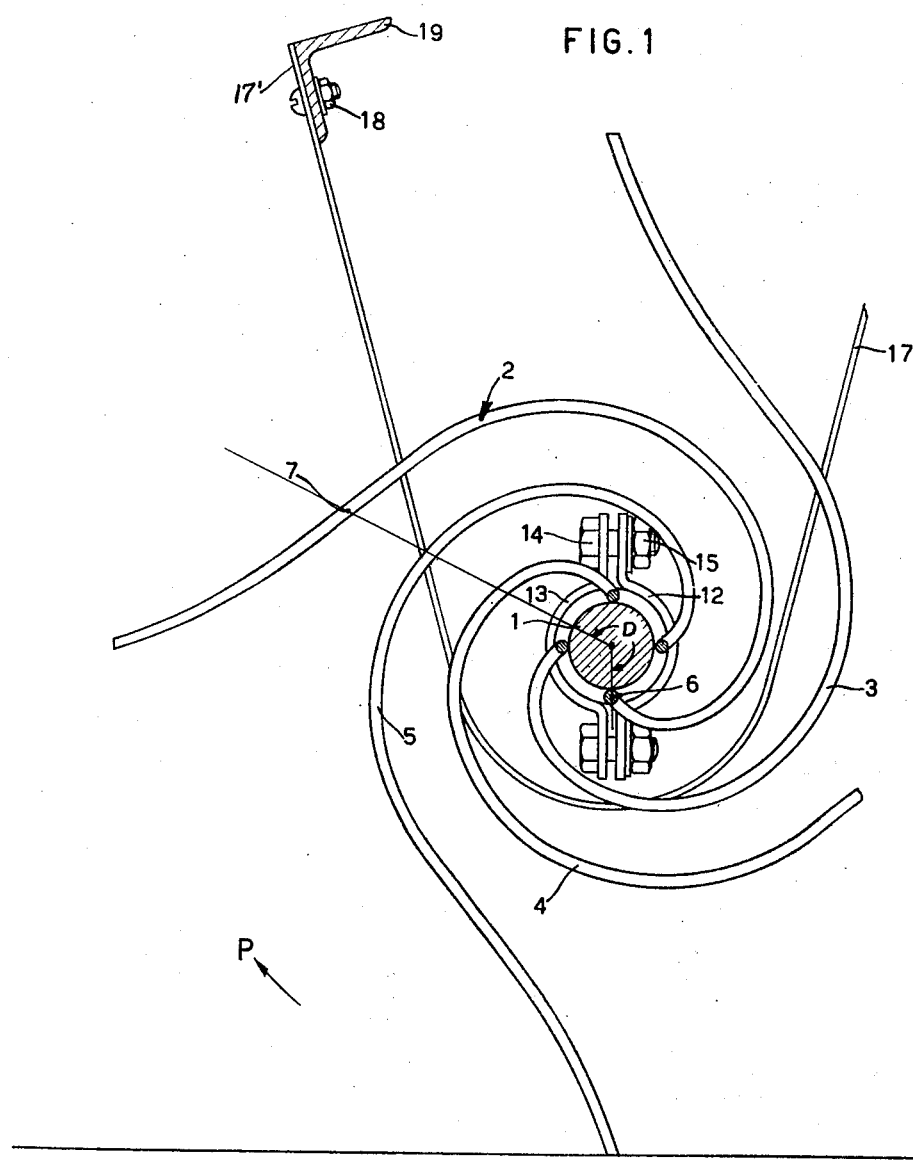
Figure 1 is a side view of the apparatus with each time four tines lying in one plane.
Figure 2:
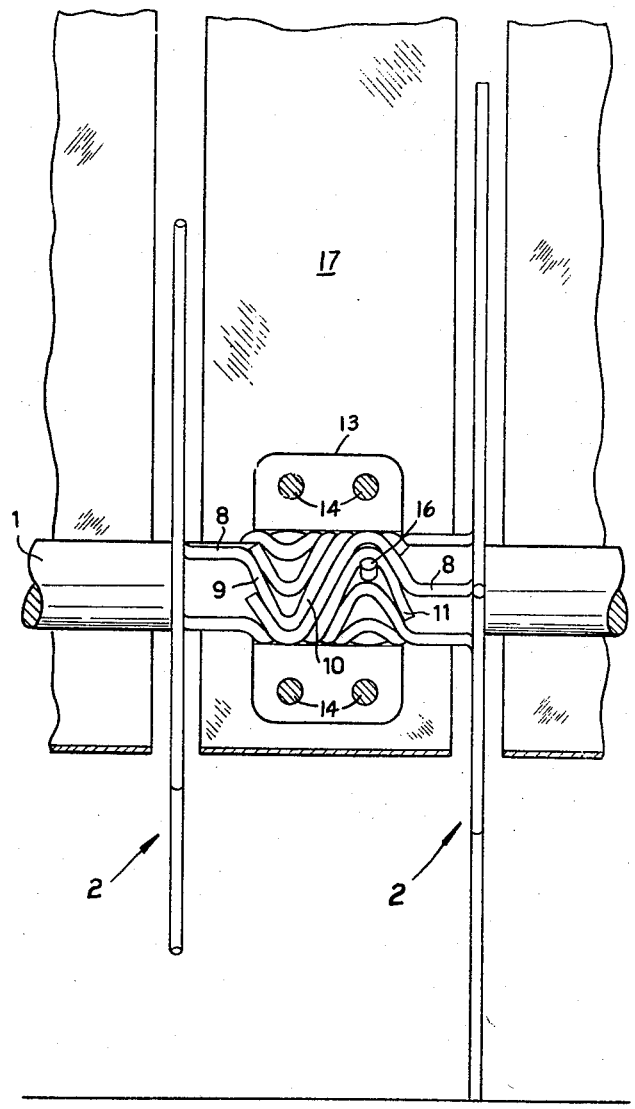
Figure 2 is a front view, partially sectioned, of the apparatus according to Figure 1 with several sets of tines arranged one beside the other.
Figure 3:
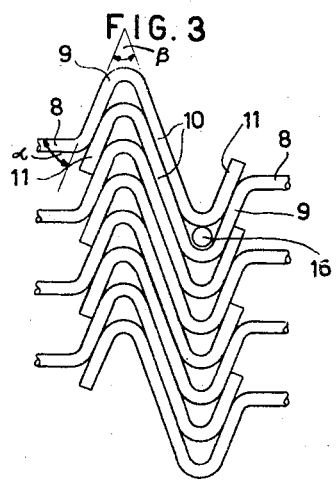
Figure 3 represents the squarely bent parts of the tines in developed condition adjoining the shaft.

The embodiment according to Figures 1–3 mainly comprises a rotatable shaft 1 and four uniform tines 2, 3, 4 and 5 secured thereto. Each of the tines issues from a point 6 near the shaft and up to the point 7 it is of a curved shape as an evolvent having the outer periphery of the shaft 1 as a base circle. In point 7 it merges in an end part which is curved in opposite direction and proceeds to the imaginary line which in the center of the shaft can be drawn perpendicularly on the imaginary line connecting the center of the shaft with the foot point 6 of the tine in question. The point 7, consequently, is a bending point in the line of the tine. It is to be noted that the evolvent extending between points 6 and 7 intercepts an angle of more than 90°. More particularly angle D is approximately 245°.

The tines which preferably are manufactured of round spring steel, lie beside each other in the form of several sets in parallel planes perpendicular to the shaft 1 (see Figure 2). Each set comprises four tines which are staggered by 90°.

In Figure 2 two sets are represented.

At its foot point or inner end 6 each tine comprises a complex formation 8—11. The complex formations 8—11 of the tines of the one set adjoin the shaft in the direction of the complex formations of the other set of tines in such a manner that these formations of the two sets lie alternatively between each other (Figures 2–3).

Each complex formation consists of a straight piece 8, an adjoining piece 9 which in developed condition (Figure 3) is at an angle α of about 75° with the piece 8, a piece 10 adjoining the piece 9 which piece 10 is about two times as long as the piece 9 and at an angle β of about 30° with the piece 9 and a piece 11 adjoining the piece 10 which part 11 in developed condition is parallel to the piece 9. In mounted condition the pieces 8—11 adjoin the shaft which means that the pieces 9—11 are bent into an S-shaped configuration.

Clamping means secure the tines to the shaft. These means comprise the pieces 9—11 of the tines and two bracket shaped clamping plates 12 and 13 which are tightened on to each other by bolts 14 and nuts 15.

The torque exerted on the shaft 1 is mainly exerted by friction on the tines. On the shaft a safety pin 16 is arranged between the parts of the tines adjoining the shaft the said pin preventing slipping of the tines in respect of the shaft.

Between each two sets of tines a V-shaped bent plate 17 is arranged passing underneath the shaft 1 and attached with both its ends 17' to angle stubs 19, only one of which is illustrated, forming a portion of the frame of the device. The plates 17 prevent the crop from winding around the shaft.

The direction of rotation of the shaft 1 is indicated by the arrow P.

Figure 4:
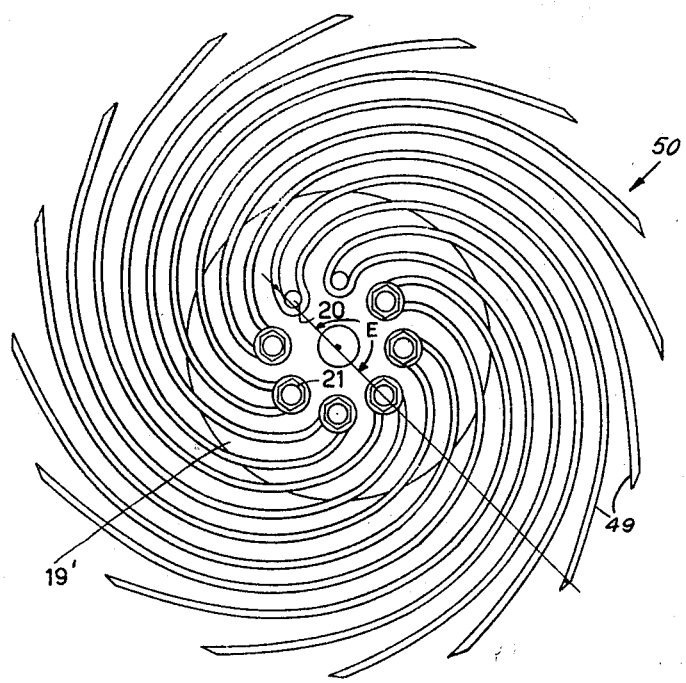
Figure 4 is a side view of the second embodiment of the apparatus.

Figure 4 is a side view of a rake wheel 50 which is freely rotatable around a shaft and arranged in an inclined position in respect of the travelling direction and adapted to laterally displace the crop during the forward movement. A plate 19' is welded on the hub of the rake wheel which plate is provided with eight bolt holes 20. The tines 49 are curved according to evolvents with as a base circle the circle on which the centers of the bolt holes lie. The angle E which the evolvent curve of each tine intercepts is equal to approximately 180°.

Each two tines lying beside each other are made of one piece of spring steel and are secured to the plate 19 by means of one bolt 21.

Just as in the embodiment according to Figures 1–3 here also the distance between adjacent tines is equal.

Having now described our invention and the objects thereof, what we claim is:

1. In an apparatus for working crops lying upon the soil, the combination comprising a rotatable shaft and at least one set of coplanar tines of uniform shape secured to said shaft; each of said tines including at least a portion comprising an evolvent curve; including a first and a second set of coplanar tines with the plane of the first set being parallel to the plane of the second set, in which the planes are perpendicular to the shaft; each of said tines having a complex portion at a first end thereof; said complex portion including a first section extending at right angles to said planes and an S-shaped section adjoining said first section; the S-shaped sections of the first set being alternately disposed between the S-shaped sections of the second set; a single clamping means engaging said S-shaped sections of both said first and said second sets for securing said sets to the shaft.

2. The combination as set forth in claim 1 also including a V-shaped plate positioned between the first and second sets of tines; the apparatus including a frame; said plate having the ends thereof secured to said frame; the rotatable shaft extending between the arms of the V-shaped plate.

3. The combination as set forth in claim 1 in which each of said tines includes a portion at a second end thereof which is curved away from said evolvent curve.

References Cited in the file of this patent
UNITED STATES PATENTS

| | | |
|---|---|---|
| Re. 23,411 | Stenzel | Sept. 11, 1951 |
| 239,250 | Hitchcock | Mar. 22, 1881 |
| 393,115 | Little | Nov. 20, 1888 |
| 2,641,101 | Redrow | June 9, 1953 |
| 2,643,505 | Harper et al. | June 30, 1953 |
| 2,727,350 | Kuhlman | Dec. 20, 1955 |
| 2,771,732 | Schramling | Nov. 27, 1956 |